No. 766,837. PATENTED AUG. 9, 1904.
H. McCORNACK.
CENTRIFUGAL SEPARATOR.
APPLICATION FILED FEB. 24, 1904.
NO MODEL.
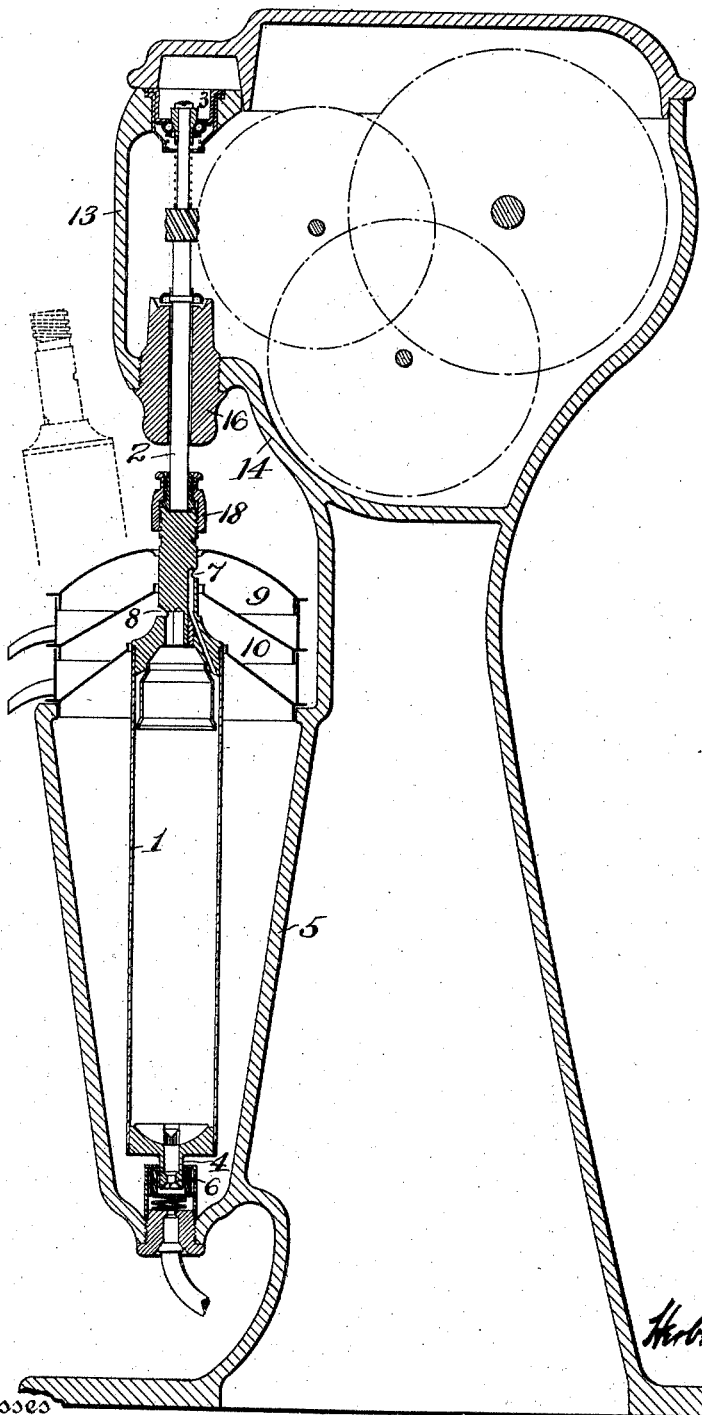
Witnesses
Herbert McCornack
Inventor
by
Attorney No. 766,837. Patented August 9, 1904.

UNITED STATES PATENT OFFICE.

HERBERT McCORNACK, OF WESTCHESTER, PENNSYLVANIA.

CENTRIFUGAL SEPARATOR.

SPECIFICATION forming part of Letters Patent No. 766,837, dated August 9, 1904.

Original application filed December 14, 1903, Serial No. 185,007. Divided and this application filed February 24, 1904. Serial No. 195,102. (No model.)

*To all whom it may concern:*

Be it known that I, HERBERT McCORNACK, a citizen of the United States, residing at Westchester, county of Chester, State of Pennsylvania, have invented certain new and useful Improvements in Centrifugal Separators, of which the following is a specification.

My invention relates more particularly to that class of centrifugal separators in which a bowl or vessel of elongated or tubular form is employed in connection with a casing for said vessel and a suitably-suspended shaft, to the lower end of which the vessel is removably coupled.

My main object is to provide a simple form of frame comprising an upper shaft-supporting portion and a lower fixed casing for the vessel so arranged as to permit the convenient insertion and removal of the uncoupled vessel, as fully described in connection with the accompanying drawing, and particularly pointed out in the subjoined claim.

The drawing shows a sectional elevation of a centrifugal machine embodying my invention.

The shaft mechanism shown in the drawing is particularly described and claimed in my pending application, Serial No. 185,007, filed December 14, 1903, and the general arrangement is similar to that shown in Patent No. 706,088, issued to me August 5, 1902.

The centrifugal vessel 1, of tubular form, is separably coupled to a hanging shaft 2, which is carried upon a top bearing 3 provided in the frame of the machine, and the hollow lower end 4 of said pendent vessel is provided with a steadying bearing mounted in the lower portion of the casing 5, which incloses the vessel. The rapid rotation of the hanging vessel 1, by means of the shaft 2 and the driving mechanism therefor, while feeding a compound liquid, such as milk, to said vessel through the bottom inlet 6 effects the separation of the liquid into its constituent parts, which are separately discharged through outlets 7 and 8, respectively, into separate milk and cream pans 9 and 10, supported upon the casing 5.

The shaft 2, as shown, is mounted in a shaft-casing 13, forming with the driving-gear casing 14 a portion of the frame of the machine. Its upper end is carried upon the suspension-bearing 3, while its lower depending portion passes loosely through the bearing-sleeve 16 and is provided at its projecting end with a suitable coupling 18, by means of which the centrifugal vessel 1 is connected or disconnected. It is very desirable that this suspended shaft shall not be disturbed in position, notwithstanding the necessity of frequently uncoupling the vessel and lifting it out of the casing 5 for cleaning or other purposes. To provide for conveniently accomplishing this while making the casing 5 a rigid portion of the frame of the machine, I so form the said fixed casing as to adapt it to serve the purposes of inclosing the full length of the tubular vessel and supporting the lower end thereof, while at the same time permitting the disconnected vessel to be tilted out of alinement with the shaft above sufficiently to enable it to pass clear of the shaft-inclosing portion of the frame above the coupling 18 while the vessel is being lowered into or raised out of the casing. (See dotted lines.) The lower end of the vessel is normally maintained, approximately, in axial alinement with the shaft by means of a suitable bearing in the casing and is supported by the casing when uncoupled from the shaft, while the wall of the casing is spread to permit the lateral tilting of the vessel, as indicated, when the milk and cream pans 9 and 10 are removed, thus enabling it to be readily passed clear of the shaft-inclosing portion of the frame above the casing either in inserting or removing the vessel from the latter.

It will be seen that by means of my invention I am able to employ a simple and rigid frame construction while providing for readily removing the vessel without interfering with the mounting of the shaft.

What I claim is—

The combination with a suspended shaft and a tubular centrifugal vessel coupled thereto, of a supporting-frame comprising a shaft-inclosing portion above the coupling and a fixed casing below the same for the depending vessel, said casing being arranged to support the lower end of the vessel and having its walls spread to permit sufficient tilting thereof when uncoupled to enable it to be freely lifted out of the casing.

In testimony whereof I affix my signature in the presence of two witnesses.

HERBERT McCORNACK.

Witnesses:
   MARY E. RUPERT,
   F. P. BYE.